(12) United States Patent
Ogawa

(10) Patent No.: US 7,747,373 B2
(45) Date of Patent: Jun. 29, 2010

(54) CONTROL DEVICE OF VEHICLE

(75) Inventor: Hiroyuki Ogawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 771 days.

(21) Appl. No.: 11/554,085

(22) Filed: Oct. 30, 2006

(65) Prior Publication Data
US 2007/0106447 A1 May 10, 2007

(30) Foreign Application Priority Data
Nov. 8, 2005 (JP) ............................ 2005-323572

(51) Int. Cl.
*G06F 7/00* (2006.01)
(52) U.S. Cl. .................. 701/96; 701/55; 701/56; 701/65; 701/69; 477/97; 477/901; 477/902
(58) Field of Classification Search .................. 701/96, 701/93, 70, 1
See application file for complete search history.

(56) References Cited

U.S. PATENT DOCUMENTS

| | | | | |
|---|---|---|---|---|
| 4,899,280 | A * | 2/1990 | Onari et al. ................. | 701/103 |
| 6,275,760 | B1 * | 8/2001 | Saito et al. .................... | 701/55 |
| 6,516,261 | B2 * | 2/2003 | Ohashi et al. ................. | 701/51 |
| 2003/0225501 | A1 * | 12/2003 | De La Salle et al. .......... | 701/93 |
| 2004/0111209 | A1 * | 6/2004 | Kagawa et al. ................ | 701/93 |
| 2005/0154506 | A1 * | 7/2005 | Takamatsu ..................... | 701/1 |

FOREIGN PATENT DOCUMENTS

| | | |
|---|---|---|
| JP | 7-69096 | 3/1995 |
| JP | 10-95252 | 4/1998 |
| JP | 2000-125405 | 4/2000 |
| JP | 2001-113989 | 4/2001 |
| JP | 2003-291685 | 10/2003 |
| JP | 2004-60528 | 2/2004 |
| JP | 2004-66843 | 3/2004 |
| JP | 2004-340102 | 12/2004 |

* cited by examiner

*Primary Examiner*—Khoi Tran
*Assistant Examiner*—Stephen Holwerda
(74) *Attorney, Agent, or Firm*—Oblon, Spivak, McClelland, Maier & Neustadt, L.L.P.

(57) ABSTRACT

An ECU (Electronic Control Unit) executes a program including a step of detecting a driver's preference potential Hdr, a step of calculating a target engine output Ptgt using Hdr when a deceleration request is detected, a step of calculating a target slippage tsl using Hdr, a step of calculating a target engine speed tne, a step of calculating a target ISC (Idle Speed Control) opening tidle from Ptgt and tne, a step of assigning a guard value to tidle when tidle is smaller than the guard value, a step of calculating a current engine output Pnow and a step of calculating a motor output (regeneration quantity) Phv from (Ptgt-Pnow).

10 Claims, 4 Drawing Sheets

CONTROL DEVICE OF VEHICLE

This nonprovisional application is based on Japanese Patent Application No. 2005-323572 filed with the Japan Patent Office on Nov. 8, 2005, the entire contents of which are hereby incorporated by reference.

BACKGROUND OF THE INVENTION

1. Field of the Invention

The present invention relates to a control device of a vehicle provided with a power train having an engine and an automatic transmission, and particularly to a control device of a vehicle that can achieve deceleration matching with a driver's preference.

2. Description of the Background Art

In generally, an automatic transmission connected to an engine of a vehicle is automatically controlled by determining a transmission gear ratio depending on an operation amount of an accelerator pedal by a driver and a vehicle speed. During ordinary driving, the gear ratio is increased with decrease in accelerator pedal operation amount or with increase in vehicle speed.

Therefore, during downhill driving or the like, a driver releases the accelerator pedal to decrease the accelerator pedal operation amount, and the gear ratio is controlled to increase so that the control is performed to decrease an engine braking effort of the vehicle. Thereby, the driver may feel unnecessary acceleration, and/or may operate a brake more times so that acceleration feeling requested by the driver cannot be achieved in some cases.

Japanese Patent Laying-Open No. 10-095252 has disclosed a vehicle drive power control device that changes an engine braking force in response to a driver's manual operation even when automatic engine brake control is active during downhill driving. This control device controls a drive force of a vehicle provided with an engine and an automatic transmission connected to the engine, and operates as follows. When a throttle is fully closed, a target deceleration resistance that matches with a target deceleration corresponding to the vehicle speed is set depending on a transmission range selected in an automatic transmission, calculation is performed to obtain a running resistance externally applied to the vehicle and a target drive resistance of the vehicle to be added to the running resistance for obtaining a target deceleration resistance, calculation is performed to obtain a range or area that can generate a vehicle drive resistance depending on the gear ratio of the automatic transmission, the gear ratio of the automatic transmission is controlled to keep the target drive resistance in the range that can generate the drive resistance, and a negative output of the engine is controlled to generate the target drive resistance with the controlled gear ratio.

According to this vehicle drive power control device, when the throttle is fully closed, the target deceleration resistance (=(vehicle mass)×(target deceleration)) that matches with the target deceleration corresponding to the vehicle speed is set depending on the transmission range selected in the automatic transmission. Also, the calculation is performed to obtain the running resistance that is externally applied to the vehicle and includes a gradient resistance, an air resistance and/or a rolling resistance, and the target drive resistance of the vehicle to be added to the running resistance is calculated to satisfy the target deceleration resistance. Although a relationship of ((target deceleration resistance)=(running resistance)+(target drive resistance)) is established, the running resistance takes a negative value (assuming that the deceleration direction is positive) when a descent gradient is large so that the target drive resistance becomes larger in absolute value than the target deceleration resistance by the magnitude of the running resistance. The vehicle drive resistance changes within a predetermined range between the maximum and minimum values under control of the negative output of the engine, and this predetermined range changes according to the gear ratio of the automatic transmission. Therefore, calculation is performed to obtain a range that can generate the vehicle drive resistance corresponding to the gear ratio of the automatic transmission, and the gear ratio of the automatic transmission is controlled such that the target drive resistance thus calculated may enter the range allowing generation of the vehicle drive resistance. As described above, the gear ratio is controlled to keep the target drive resistance within the range that can generate the vehicle drive resistance as described, and further the negative output of the engine is controlled to provide the drive resistance of the vehicle matching with the target drive resistance. Thereby, the target drive resistance is obtained, and the vehicle is decelerated with the target deceleration. When a driver changes a transmission range of the automatic transmission with an operation lever or the like, a new target deceleration resistance is set, and thereby the drive resistance of the vehicle is controlled to change according to the change in target drive resistance. Therefore, the engine braking force can reliably change in such an expected manner that the engine braking force changes according to the transmission range selection of the driver.

Although a vehicle drive force control device disclosed in Japanese Patent Laying-Open No. 10-095252 can achieve the target drive resistance, there is doubt about whether the achieved target drive resistance matches with the deceleration requested by the driver or not. More specifically, there is a technique that a driver's preference (sporty preference allowing rapid acceleration/deceleration and a large lateral G (Gravity), or a comfort preference for enjoying gentle driving) is estimated or is set by the driver to achieve the vehicle's behavior matching with the driver's preference. Since such driver's preference is not reflected in the calculation of the target drive resistance, the vehicle drive force control device disclosed in Japanese Patent Laying-Open No. 10-095252 does not reflect the driver's preference. Consequently, the driver's preference is not reflected in the deceleration operation, and the driver feels the deceleration caused by unexpected engine braking.

SUMMARY OF THE INVENTION

The invention has been made for overcoming the above problems, and an object of the invention is to provide a control device of a vehicle that can achieve deceleration feeling matching with a driver's preference.

A control device of a vehicle according to the invention controls a vehicle having a power train including a power source, a transmission coupled to the power source and a fluid coupling arranged between the power source and the transmission. This control device includes a detector detecting a preference of a driver about deceleration in an idle state, and a controller controlling the vehicle. The controller controls at least one of an output of the power source and an operation state of the fluid coupling based on the preference.

According to this invention, when the detector detects the preference allowing rapid deceleration, the target output of an engine that is an example of the power source can be set small to increase the engine braking effort. When the above preference is not detected, the target output of the engine can be set large not to increase the engine braking effort. When the above preference is detected, the setting can be performed to decrease a target slippage of a torque converter that is an example of the fluid coupling and thereby to improve responses of deceleration and reacceleration. When the above preference is not detected, the setting can be performed to increase the target slippage of the torque converter and thereby to absorb variations in rotation of the power source by the torque converter for improving NV (Noise and Vibration) characteristics. In this manner, the good deceleration feeling can be achieved according to the driver's preference. Consequently, it is possible to provide the control device of the vehicle that can achieve the deceleration feeling matching with the driver's preference.

Preferably, the detector detects whether the driver has the preference allowing the rapid deceleration or not. When the driver has the above preference, the controller controls the power source to provide the output smaller than that provided when the driver does not have the above preference.

According to this invention, when the detector detects the preference allowing the rapid deceleration, the target output of an engine that is an example of the power source can be set small to increase the engine braking effort, and thereby the good deceleration feeling can be achieved according to the driver's preference.

Further preferably, the power source is an engine and an electric motor, and the motor can receive the power from the engine to generate an electric power. This controller controls a rotation speed of the engine in an idle state such that the output of the engine corresponds to a limit value determined by the control of the rotation speed of the engine in the idle state when the engine output determined by the control of reducing the engine output according to the preference is lower than the limit value, and controls the motor to use, as a power for electric power generation by the motor, a surplus output of the engine produced by controlling the engine output to correspond to the limit value.

According to this invention, when the control of the rotation speed of the engine in the idle state is achieved, e.g., by an ISC (Idle Speed Control) function, a value opening cannot be lower than a lower limit of an ISC valve opening that is set as a limit value. Therefore, the output of the engine is set to a value defined by the lower limit of the ISC valve opening (which is synonymous with that the ISC valve opening is set to the lower limit opening) so that the engine output cannot be fully restricted. In this case, the motor consumes the output of the engine by performing the electric power generation, and can lower the engine output. Therefore, the engine braking effort can be increased. Consequently, good deceleration feeling can be achieved according to the driver's preference.

Further preferably, an idle speed controller adjusting an opening of an idle speed control valve achieves the control of the rotation speed of the engine in the idle state. The controller sets the opening of the idle speed control valve to a lower limit value when the opening of the idle speed control valve determined by the control of reducing the output of the engine according to the preference is lower than the lower limit value.

According to the invention, since the engine output is determined by the lower limit of the ISC valve opening, the engine output cannot be fully restricted. In this case, the motor consumes the output of the engine by performing the electric power generation, and thereby reduces the output of the engine transmitted to a drive system so that the large engine braking effort can be achieved.

Further preferably, the detector determines whether the driver has a preference allowing rapid deceleration or not.

The controller controls a rotation speed of the power source such that a slippage occurring in the fluid coupling when the driver has the above preference is smaller than that occurring when the driver does not have the above preference.

According to this invention, when the detector detects the preference allowing the rapid deceleration, the torque converter that is an example of the fluid coupling is set to reduce the target slippage and thereby to improve the responses of the deceleration and reacceleration so that the deceleration feeling matching with the driver's preference can be achieved. The manner of achieving the target slippage in the fluid coupling is not restricted and, for example, such a manner may be employed that controls a connection state of a clutch that mechanically and disengageably connects the input and output shafts of the fluid coupling.

Further preferably, the fluid coupling includes a clutch mechanically and disengageably connecting input and output shafts together. The controller controls a connection state of the clutch to increase the degree of connection of the clutch when the rotation speed of the power source is lower than a target rotation speed calculated using a slippage based on the preference.

According to this invention, when the target slippage is large, the target rotation speed of the power source is larger than that in the case where the target slippage is small (assuming that the output shaft rotation speed of the fluid coupling is constant). In this case, when the actual rotation speed of the power source does not reach the target rotation speed, the degree of connection or engagement of the clutch can be increased to raise the rotation speed of the power source to the target rotation speed. Thus, the torque converter that is an example of the fluid coupling has an insufficient capacity for achieving the target output, and therefore the capacity is increased by the connection of the clutch.

Further preferably, the detector determines whether the driver has a sporty preference allowing rapid deceleration or not.

According to the invention, when the detector detects the driver's sporty preference allowing the rapid deceleration, the engine output is lowered and/or the slippage of the torque converter is reduced so that the engine braking effort is increased and/or the responses of the acceleration and deceleration are improved.

Further preferably, the detector determines whether the driver has a comfort preference not allowing rapid deceleration or not.

According to the invention, when the detector detects that the driver has the comfort preference not allowing rapid deceleration, the engine output is raised and/or the slippage of the torque converter is increased so that the engine braking effort is decreased and/or the NV characteristics in the acceleration and deceleration operations are improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description and drawings, the same parts bear the same reference numbers and the same names, and achieve the same functions. Therefore, description thereof is not repeated.

Figure 1:
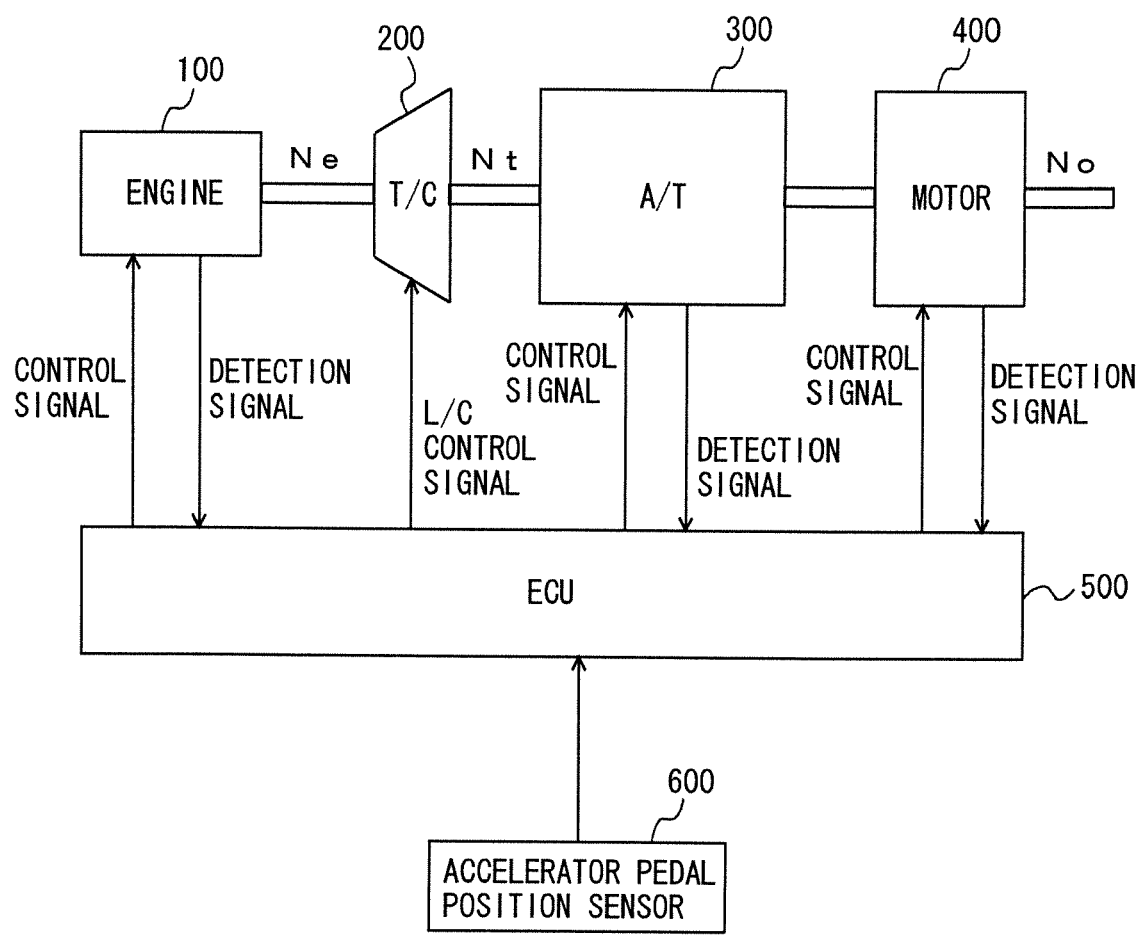
FIG. 1 shows control blocks including an ECU that is a control device of a vehicle according to an embodiment.

FIG. 1 illustrates a power train of a vehicle including an ECU that is a control device according to an embodiment of the invention.

As shown in FIG. 1, this vehicle includes an engine 100, a torque converter 200, an automatic transmission 300, an electric motor 400 assisting the engine, an ECU (Electronic Control Unit) 500 controlling them and an accelerator pedal position sensor 600 providing a signal indicative of a position of an accelerator pedal to ECU 500.

The following description will be given on a drive power control that is applied to the power train having engine 100, torque converter 200, automatic transmission 300 and motor 400 as shown in FIG. 1. However, the invention is not restricted to this. The motor is not essential. Motor 400 is a motor generator, and also functions as an electric power generator driven by drive wheels and engine 100.

ECU 500 provides control signals such as a throttle opening instruction signal to engine 100, and receives detection signals such as an engine speed signal. ECU 500 generally has an ISC control function. This ISC control function keeps a constant idling speed. More specifically, an air passage bypassing a throttle valve of engine 100 is arranged, and an actuator drives a choking portion in the passage to regulate an air (mixture) flow rate and thereby to control the idling speed. This ISC control function for changing the idling speed toward a target value is achieved by feedback control. This feedback control can substantially keep the constant speed in engine 100. More specifically, the ISC control function, which is actually achieved by a program held in ECU 500, causes an idle speed control valve to regulate the air flow rate in the bypass passage of the throttle valve, and thereby controls the idling speed to keep a desired value. The idling air flow rate achieved by the above feedback control has been learned by reflecting a result of the feedback.

ECU 500 provides a control signal instructing engagement or release (including slip) to a lockup clutch of torque converter 200. ECU 500 provides a control signal that is an oil pressure instruction signal to automatic transmission 300, and receives detection signals such as an output shaft rotation speed signal from automatic transmission 300.

Automatic transmission 300 is formed of a fluid coupling and a gear type of multistage (noncontinuously) variable transmission mechanism, or is formed of a belt type or a traction type of continuously variable transmission mechanism in many cases. This fluid coupling is formed of foregoing torque converter 200, which includes the lockup clutch. The lockup clutch is configured to couple mechanically and directly a member on the drive side (i.e., a pump impeller on the engine (100) side) of torque converter 200 and a member on the driven side (i.e., a turbine runner on the automatic transmission (300) side). This can improve both the fuel consumption and the ride quality. A lockup range in which the lockup clutch is engaged is usually set based on, e.g., a vehicle speed and a throttle opening.

Accelerator pedal position sensor 600 detects the position of the accelerator pedal operated by a driver. This accelerator pedal position sensor 600 may be replaced with a throttle valve opening sensor.

When the driver enters a degree of desire for sporty drive (e.g., selectable from among five or 10 levels) via a drive preference switch, ECU 500 controls the acceleration (deceleration) of the vehicle according to the degree of desire for the sporty drive during a decelerating operation (i.e., when an accelerator pedal is not depressed). For example, when the accelerator pedal is not depressed and the degree of driver's desire for the sporty drive is large, large deceleration is caused. Conversely, when the degree of driver's desire for the sporty drive is small, small deceleration is caused to improve the NV characteristics. For the sake of simplicity, the "comfort drive" is used as the words opposite to the "sporty drive".

ECU 500 may be configured to obtain automatically the degree of driver's desire for the sporty drive. For example, ECU 500 obtains information about a current position from a navigation system, and will detect a value of a lateral G during cornering when a vehicle is not detected ahead before the cornering. When the average of the detected lateral G values is equal to or larger than a threshold, ECU 500 determines that the driver has the sporty preference allowing reception of a large lateral G during cornering. In this manner, drive behavior (the quantity of brake pedal depression, state of acceleration/deceleration, lateral G value and the like) of the driver is analyzed, and thereby the degree of driver's desire for the sporty drive can be automatically obtained. This degree of desire for the sporty drive (or the degree of desire for the comfort drive) is quantified as a driver's preference potential Hdr. For example, such setting is employed that the degree of desire for the sporty drive is high when driver's preference potential Hdr is large, and the degree of desire for the comfort drive is high when driver's preference potential Hdr is small.

In the following description, Ne represents the rotation speed of engine 100 (i.e., engine speed), Nt represents the rotation speed of the output shaft of torque converter 200 (i.e., turbine speed) and No represents the rotation speed of the output shaft of motor 400 (i.e., output speed).

Figure 2:
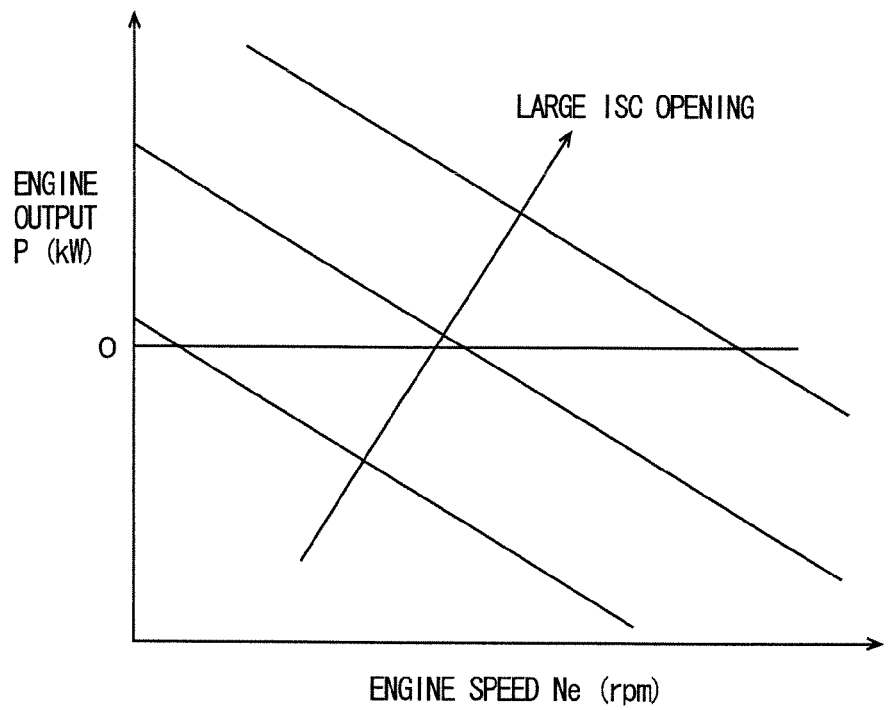
FIG. 2 illustrates a relationship between an engine speed and an engine output, using an ISC opening as a parameter.

FIG. 2 illustrates a relationship between engine speed Ne and an engine output P, using an ISC opening as a parameter. According to characteristics near the idling speed of engine 100, there is a tendency that engine output P lowers with increase in engine speed Ne. In addition to this tendency, engine output P rises with increase in ISC opening (because of increases in air quantity and fuel quantity). The target value (target engine output) of the engine output given by the ordinate in FIG. 2 is determined in view of driver's preference potential Hdr. Since this invention is focused on the deceleration operation, the calculation is performed to decrease engine output P when the sporty preference exhibiting the desire for large deceleration is strong, and to increase engine output P when the comfort preference exhibiting the desire for small deceleration is strong. The ISC opening can be calculated from the map in FIG. 2 based on the target engine speed and the target engine speed determined in view of driver's preference potential Hdr.

Figure 3:
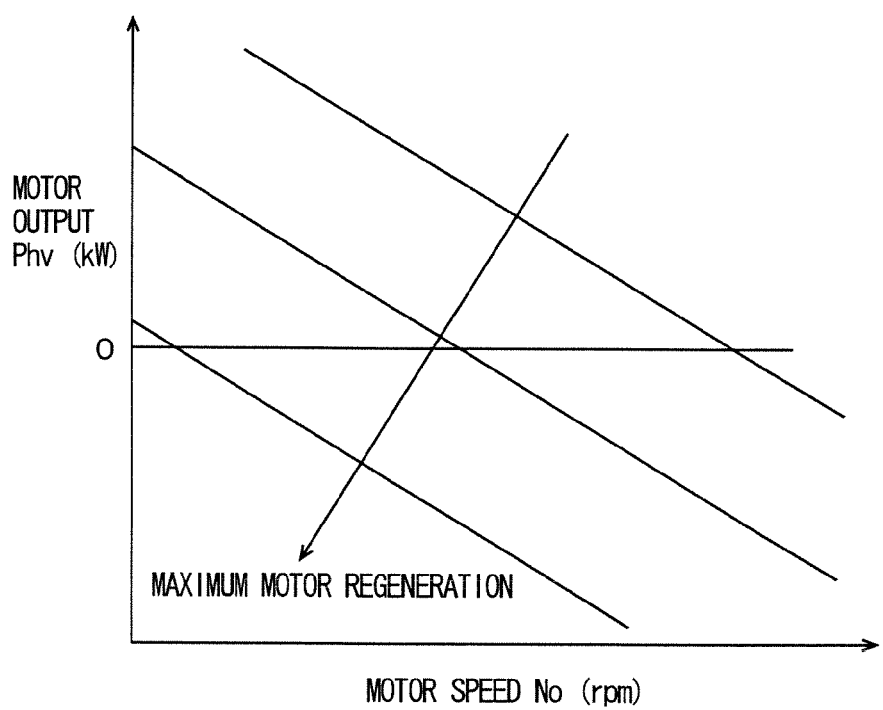
FIG. 3 illustrates a relationship between a motor speed and a motor output, using a motor regeneration quantity as a parameter.

FIG. 3 illustrates a relationship between motor speed No and a motor output Phv, using a motor regeneration quantity as a parameter. Similarly to the characteristics of engine 100, characteristics of motor 400 exhibit a tendency that the output lower with increase in rotation speed. In addition to this tendency, motor output Phv lowers when the motor regeneration quantity is large (because the motor output is used for regenerative power generation). More specifically, when the ISC opening obtained from FIG. 2 is lower than the guard value of the ISC that determines the lower limit value, the ISC opening must be inevitably equal to the lower limit value, i.e., the guard value (otherwise engine 100 may stall). In this case, the motor regeneration quantity is raised to use the output of engine 100 for the electric power generation, and it becomes possible to lower output P of engine 100 that cannot be fully restricted due to the ISC guard value. Thus, as the output of engine 100 decreases, the engine brake becomes more effective to increase the deceleration so that the sporty preference is satisfied. Conversely, as the output of engine 100 increases, the engine brake becomes less effective to decrease the deceleration so that the comfort preference is satisfied. Accordingly, as the degree of desire for the sporty preference increases, the regeneration quantity is increased whereby the engine brake can become more effective thus preferable.

Figure 4:
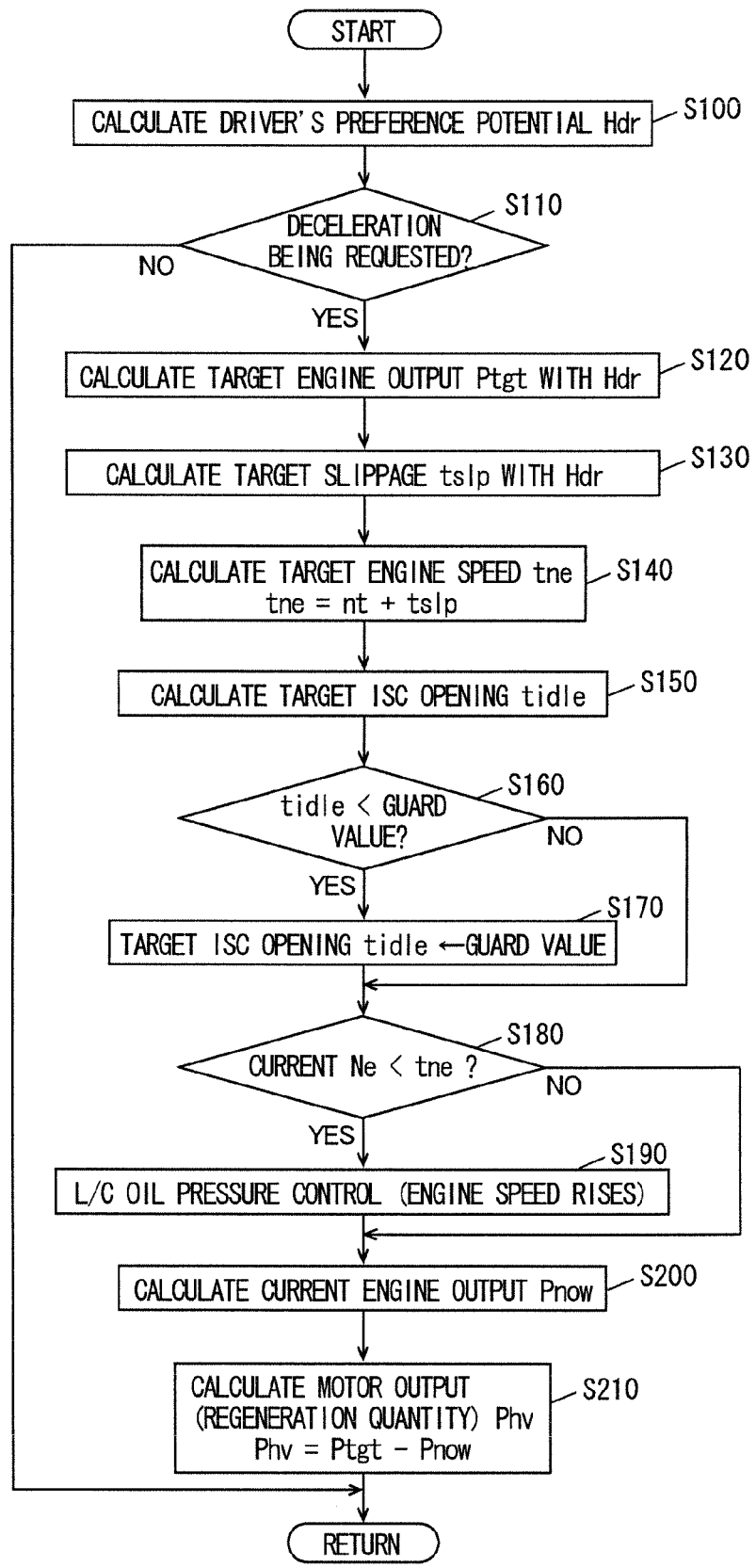
FIG. 4 is a flowchart illustrating a control structure for programs executed by the ECU.

Referring to FIG. 4, description will now be given on a control structure for programs executed by ECU 500 that is the control device according to the embodiment.

In step S100, ECU 500 calculates driver's preference potential Hdr. In this step, ECU 500 calculates driver's preference potential Hdr based on the degree of driver's desire for the sporty preference that is provided via the drive preference switch by the driver as well as the degree of driver's desire for the sporty drive that is automatically obtained.

In step S110, ECU 500 determines whether the driver is requesting the deceleration or not. When the deceleration is being requested (Yes in step S110) because of, e.g., a small degree of accelerator pedal depression, the process proceeds to step S120. Otherwise (No in step S110), the process ends.

In step S120, ECU 500 calculates a target engine output Ptgt, using driver's preference potential Hdr. In this operation, when driver's preference potential Hdr is large (i.e., when the degree of desire for the sporty drive is high), calculated target engine output Ptgt is small and the engine brake becomes more effective. When driver's preference potential Hdr is small (i.e., when the degree of desire for the comfort drive is high), calculated target engine output Ptgt is large, and the engine brake becomes less effective.

In step S130, ECU 500 calculates a target slippage tslp, using driver's preference potential Hdr. In this operation, when driver's preference potential Hdr is large (i.e., when the degree of desire for the sporty drive is high), calculated target slippage tslp is small, and torque vibrations increase. When driver's preference potential Hdr is small (i.e., when the degree of desire for the comfort drive is high), calculated target slippage tslp is large, and the torque vibrations decrease. Even in the case where the torque vibrations occur, slip occurs between the pump side and the turbine side in torque converter 200 when slippage tslp is large. Therefore, the torque variations are not transmitted to the drive wheel side so that the torque variations are small. These small torque variations correspond to the comfort drive.

In step S140, ECU 500 calculates a target engine speed the from (tne=nt+tslp). In step S150, ECU 500 calculates a target ISC opening tidle. In this operation, the map of FIG. 2 is used such that the ordinate gives target engine output Ptgt calculated in step S120 and the abscissa gives target engine speed the calculated in step S140, and the ISC opening represented as the parameter is calculated as target ISC opening tidle.

In step S160, ECU 500 determines whether target ISC opening tidle is smaller than the guard value of the ISC or not. When target ISC opening tidle is smaller than the guard value of the ISC (YES in step S160), the process proceeds to step S170. Otherwise, (NO in step S160), the process proceeds to step S1180.

In step S170, ECU 500 assigns the guard value of the ISC to the target ISC opening tidle smaller than the guard value of the ISC. This sets the opening larger than the target ISC opening that is calculated using driver's preference potential Hdr, and a larger engine output is achieved.

In step S180, ECU 500 determines whether current Ne that is a current engine speed is smaller than target engine speed the or not. In this processing, an estimated (or future) engine speed may be used instead of the current engine speed. When current Ne that is the current engine speed is smaller than target engine speed the (YES in step S180), the process proceeds to step S190. Otherwise (NO in step S180), the process proceeds to step S200.

In step S190, ECU 500 performs the oil pressure control for the lockup clutch to increase the rotation speed of engine 100. More specifically, when target engine speed the cannot be achieved, the lockup clutch is engaged with or without slip. When the capacity of torque converter 200 is insufficient to achieve the target output, the lockup clutch virtually increases the capacity.

In step S200, ECU 500 calculates a current engine output Pnow. In step S210, ECU 500 calculates a motor output (regeneration quantity) Phv from a formula of (Phv=Ptgt−Pnow). In this step, target ISC opening tidle may be smaller than the guard value, and it may be impossible to achieve small target engine output Ptgt even when the sporty drive is desired. In this case, motor 400 operates as the electric power generator, and performs the regenerative power generation with a difference (a surplus of the engine output) between target engine output Ptgt and current engine output Pnow. Thereby, even when engine 100 generates the power exceeding target engine output Ptgt due to the fact that the target ISC opening cannot be set equal to or lower than the ISC guard value, motor 400 consumes the surplus engine output so that target engine output Ptgt can be achieved.

Based on the structure and flowchart described above, ECU 500 that is the control device according to the embodiment operates as follows.

When the vehicle is running, driver's preference potential Hdr is calculated (step S100). When the driver requests deceleration (YES in step S110), target engine output Ptgt is calculated in view of driver's preference potential Hdr. When driver's preference potential Hdr is large (i.e., when the degree of desire for the sporty drive is high), target engine output Ptgt of a small value is calculated to increase the engine braking effort (step S120). Further, target slippage tslp is calculated in view of driver's preference potential Hdr. When driver's preference potential Hdr thus calculated is large (i.e., when the degree of desire for the sporty drive is high), target slippage tslp of a small value is calculated to increase the torque variations.

Figure 5:
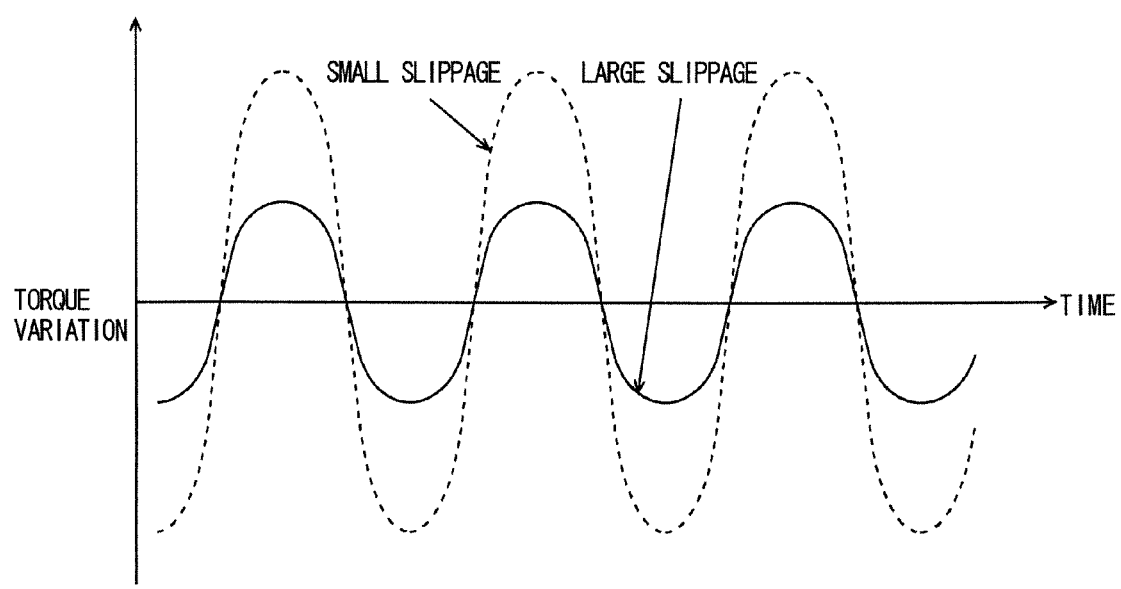
FIG. 5 illustrates a relationship between a slippage and a torque vibration of a torque converter.

FIG. 5 illustrates a relationship between the torque variation and the slippage of torque converter 200. The torque variations become small when the slippage of torque converter 200 is large, and the torque variations become large when the slippage of torque converter 200 is small.

When the slippage of torque converter 200 is small, variations ΔNe in rotation speed of engine 100 decrease to shorten a rising time and thereby the acceleration/deceleration response can be improved. When the slippage of torque converter 200 is large, the torque variations decrease so that the NV characteristics are improved.

When driver's preference potential Hdr is large (i.e., when the degree of desire for the sporty drive is high), target engine output Ptgt is small, and target slippage tslp of a small value is calculated. When driver's preference potential Hdr is small (i.e., when the degree of desire for the comfort drive is high), target engine output Ptgt is large, and target slippage tslp of a large value is calculated.

Target engine speed the is calculated by adding target slip rotation speed tslp to turbine speed nt of torque converter 200 (step S140). Using the map of FIG. 2, target ISC opening tidle is calculated from target engine speed the and target engine output Ptgt (step S150).

When driver's preference potential Hdr is large (i.e., when the degree of desire for the sporty drive is high), target engine output Ptgt of a small value is calculated, and calculated target ISC opening tidle may be smaller than the ISC guard value (YES in step S160). In this case, target ISC opening tidle is used as the ISC guard value (step S170), and current engine output Pnow is calculated (step S200). An output difference obtained by subtracting current engine output Pnow from target engine output Ptgt is used as regeneration output of motor 400, and motor 400 consumes, by electric power generation, the difference by which the output of engine 100 cannot be lowered due to the ISC guard (step S210).

As described above, the control device of the vehicle of the embodiment calculates the target engine output for the requested deceleration based on the driver's preference so that the engine braking effort matches with the driver's preference. For increasing the engine braking effort, the target engine torque must be lowered, but the engine output cannot be lowered due to the ISC guard value because the deceleration is being performed in the idle state. In this case, control is performed to provide the engine output equal to the value determined by the ISC guard value (using the target ISC opening as the ISC guard value), and the motor consumes a part of the engine output by the electric power generation. Since the motor consumes, by the electric power generation, the part by which the engine output cannot be lowered due to the ISC guard value, such a situation can be avoided that the above part is transmitted from the engine to drive wheels, and the engine brake (degree of deceleration) can be achieved according to the driver's preference.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of a vehicle having a power train including a power source, a transmission coupled to said power source and a fluid coupling arranged between said power source and said transmission, comprising:
    a detector configured for detecting a preference of a driver about deceleration of the vehicle when said power source is in an idle state; and
    a controller configured for controlling said vehicle,
    wherein said controller controls at least one of an output of said power source and an operation state of said fluid coupling based on said detected preference,
    wherein said detector detects whether the driver preference is for allowing rapid deceleration, and when the driver has said preference for allowing rapid deceleration, said controller controls said power source to provide the output to be smaller than that provided when said driver does not have said preference,
    and wherein said power source is an engine and an electric motor, and said motor can receive the power from the engine to generate electric power, and said controller controls a rotation speed of said engine in the idle state such that the output of said engine is set to correspond to a limit value determined by the control of the rotation speed of said engine in said idle state when said engine output determined according to said preference is lower than said limit value, and said motor uses, as power for electric power generation by said motor, a surplus output of the engine produced by controlling said engine output to correspond to said limit value.

2. The control device of the vehicle according to claim 1, wherein
    said detector determines whether the driver preference is for allowing deceleration, and
    said controller controls a rotation speed of said power source such that a slippage occurring in said fluid coupling when the driver preference is for allowing rapid deceleration is smaller than that occurring when the driver does not have said preference.

3. The control device of the vehicle according to claim 2, wherein
    said fluid coupling includes a clutch mechanically and disengageably connecting input and output shafts together, and
    said controller controls a connection state of said clutch to increase the degree of connection of said clutch when the rotation speed of said power source is lower than a target rotation speed calculated using a slippage based on said detected preference.

4. The control device of the vehicle according to any one of preceding claims 1 and 2 to 3, wherein
    said detector determines whether the driver preference is for sporty performance allowing rapid deceleration.

5. The control device of the vehicle according to any one of preceding claims 1 and 2 to 3, wherein
    said detector determines whether the driver preference is for comfort without allowing rapid deceleration.

6. A control device of a vehicle having a power train including a power source, a transmission coupled to said power source and a fluid coupling arranged between said power source and said transmission, comprising:
    detecting means for detecting a preference of a driver about deceleration of the vehicle when said power source is in an idle state; and
    control means for controlling at least one of an output of said power source and an operation state of said fluid coupling based on said detected preferences,
    wherein said detecting means includes means for detecting whether the driver preference is for allowing rapid deceleration, and said control means includes means for controlling said power source such that the output provided from said power source is smaller when the driver has said preference for allowing rapid deceleration than that provided when said driver does not have said preference,
    and wherein said power source is an engine and an electric motor, and said motor can receive the power from the engine to generate electric power, and said control device further comprises idle control means for controlling a rotation speed of said engine in the idle state; setting means for setting the output of said engine to a value corresponding to a limit value determined by said idle control means when said engine output determined according to said preference by said control means is lower than said limit value; and motor control means for controlling said motor to use, as power for electric power generation by said motor, a surplus output of the engine produced by controlling said engine output to correspond to said limit value.

7. The control device of the vehicle according to claim 6, wherein
    said detecting means includes means for determining whether the driver preference is for allowing rapid deceleration, and said control means includes means for controlling a rotation speed of said power source such that a slippage occurring in said fluid coupling when the driver preference is for allowing rapid deceleration is smaller than that occurring when the driver does not have said preference.

8. The control device of the vehicle according to claim 7, wherein said fluid coupling includes a clutch mechanically and disengageably connecting input and output shafts together, said control device further comprises clutch control means for controlling a connection state of said clutch, and said clutch control means includes means for controlling said clutch to increase the degree of connection of said clutch when the rotation speed of said power source is lower than a target rotation speed calculated using a slippage based on said detected preference.

9. The control device of the vehicle according to any one of preceding claims 6 and 7 to 8, wherein said detecting means includes means for determining whether the driver preference is for sporty performance allowing rapid deceleration.

10. The control device of the vehicle according to any one of preceding claims 6 and 7 to 8, wherein said detecting means includes means for determining whether the driver preference is for comfort not allowing rapid deceleration.

* * * * *